United States Patent
Acharya et al.

(10) Patent No.: US 7,243,122 B2
(45) Date of Patent: *Jul. 10, 2007

(54) COMPUTER IMPLEMENTED METHOD AND APPARATUS FOR FULFILLING A REQUEST FOR INFORMATION CONTENT WITH A USER-SELECTABLE VERSION OF A FILE CONTAINING THAT INFORMATION CONTENT

(75) Inventors: Swarup Acharya, New Providence, NJ (US); Henry F. Korth, Lower Gwynedd, PA (US); Viswanath Poosala, Highland Park, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 407 days.

This patent is subject to a terminal disclaimer.

(21) Appl. No.: 10/955,445

(22) Filed: Sep. 30, 2004

(65) Prior Publication Data

US 2005/0065999 A1    Mar. 24, 2005

Related U.S. Application Data

(63) Continuation of application No. 09/328,627, filed on Jun. 9, 1999, now Pat. No. 6,826,593.

(60) Provisional application No. 60/098,737, filed on Sep. 1, 1998.

(51) Int. Cl.
G06F 15/16       (2006.01)

(52) U.S. Cl. ...................... 709/203; 709/217

(58) Field of Classification Search ........ 709/200–203, 709/217–227
See application file for complete search history.

(56) References Cited

U.S. PATENT DOCUMENTS

| | | | |
|---|---|---|---|
| 5,442,749 A | 8/1995 | Northcutt et al. ...... 395/200.09 |
| 5,706,502 A | 1/1998 | Foley et al. ................ 395/610 |
| 5,764,235 A | 6/1998 | Hunt et al. ................. 345/428 |
| 5,852,435 A | 12/1998 | Vigneaux et al. ........... 345/302 |
| 6,006,231 A | 12/1999 | Popa .......................... 707/101 |
| 6,085,199 A | 7/2000 | Rose .......................... 707/104 |
| 6,144,996 A * | 11/2000 | Starnes et al. .............. 709/217 |
| 6,167,441 A | 12/2000 | Himmel ....................... 709/217 |
| 6,211,881 B1 * | 4/2001 | Gabler et al. ................ 345/418 |
| 6,253,229 B1 | 6/2001 | Nielsen et al. .............. 709/203 |

(Continued)

OTHER PUBLICATIONS

Cost-Aware WWW Proxy Caching Algorithms@, Pai Cao and Sandy Irani, Technical Report CS-TR-97-1343, University of Wisconsin, Madison, May 1997.

(Continued)

*Primary Examiner*—Moustafa M. Meky

(57) ABSTRACT

A method of fulfilling a request for information content with a user-selectable version of a file containing that information content. Selection of a hyperlink to information content results in generation of a menu of versions of files containing that information content. The menu displays options for versions which are derivable therefrom by a computer program for converting files from one version to another version. Selection of an option for a materialized version results in transmission of the materialized version. Selection of an option for a version which is not materialized results in derivation of the user-selected version from either a materialized version or any other version from which the user-selected version may be derived. Apparatuses for carrying out the inventive method are also provided.

26 Claims, 4 Drawing Sheets

U.S. PATENT DOCUMENTS

| | | | |
|---|---|---|---|
| 6,281,874 B1 | 8/2001 | Sivan et al. | 345/127 |
| 6,300,959 B1 * | 10/2001 | Gabler et al. | 345/473 |
| 6,343,350 B1 | 1/2002 | LaMaire et al. | 711/156 |
| 6,378,053 B1 | 4/2002 | Lamaire et al. | 711/159 |
| 6,389,460 B1 * | 5/2002 | Stewart et al. | 709/217 |
| 6,510,469 B1 * | 1/2003 | Starnes et al. | 709/247 |
| 6,563,517 B1 * | 5/2003 | Bhagwat et al. | 715/735 |
| 6,578,073 B1 * | 6/2003 | Starnes et al. | 709/219 |

OTHER PUBLICATIONS

"Adapting to Network and Client Variability Via On-Demand Dynamic Distallation", Armando Fox, Steven D. Gribble, Eric A. Brewer and Elan Emir, In *Proceedings of the Seventh International Conference on Architectural Support for Programming Languages and Operating Systems*, pp. 160-170, Cambridge, Massachusetts, Oct. 1-5, 1996. ACM Sigarch, Sgiops, Sigplan, and the IEEE Computer Society.

Fast Approximate Answers to Aggregate Queries on a Data Cube, Viswanath Poosala and Venkatesh Ganti, Submitted for Publication, 1997.

"Exploring Bounds of Web Latency Reduction from Caching and Prefetching", T. Kroeger, D. Long and J. Mogul, USENIX Symposium on Internet Technologies and Systems, 1998.

"Quality Controlled Compression of Sets of Images", Miron Livny and Viresh Ratnakar, MMDBMS '96, 1996.

"System-Wide Multiresolution" R. L. Read, D. S. Fussell and A. Silberschatz, Technical Report TR-93-04, The University of Texas at Austin, Department of Computer Sciences, Feb. 1993.

"Scenarios for the Delivery of Negotiated Content", Edward Hardie, NASA NIC, Downloaded from the World Wide Web @ http://www.ietf.org prior to May 1998.

"Ericsson Speeds Up Wireless Web Browsing" Business Wire, May 18, 1999.

Wired News: Intel's Bid for Faster Downloads—Reuters [online] [Retrieved on Mar. 3, 2004] Retrieved from the Internet using <URL http://www.wired.com/news/technology/0,1282,9726,00.html.

Stating the obvious—TranSending the Client. Jul. 28, 1997:: Michael Sippey [online] [Retrieved on Mar. 3, 2004] Retrieved from the Internet using <URL http://www.theobvious.com/archive/1997/07/28.html997.

News Release #14565, May 5, 1997—UC Berkeley researchers devise Internet's first "transformational proxy" to speed Web access for users connected by slow phone lines: By Robert Sanders [online] [Retrieved on Mar. 3, 2004] Retrieved from the Internet using <URL http://www.berkeley.edu/news/media/releases/97legacy/proxy.html.

* cited by examiner

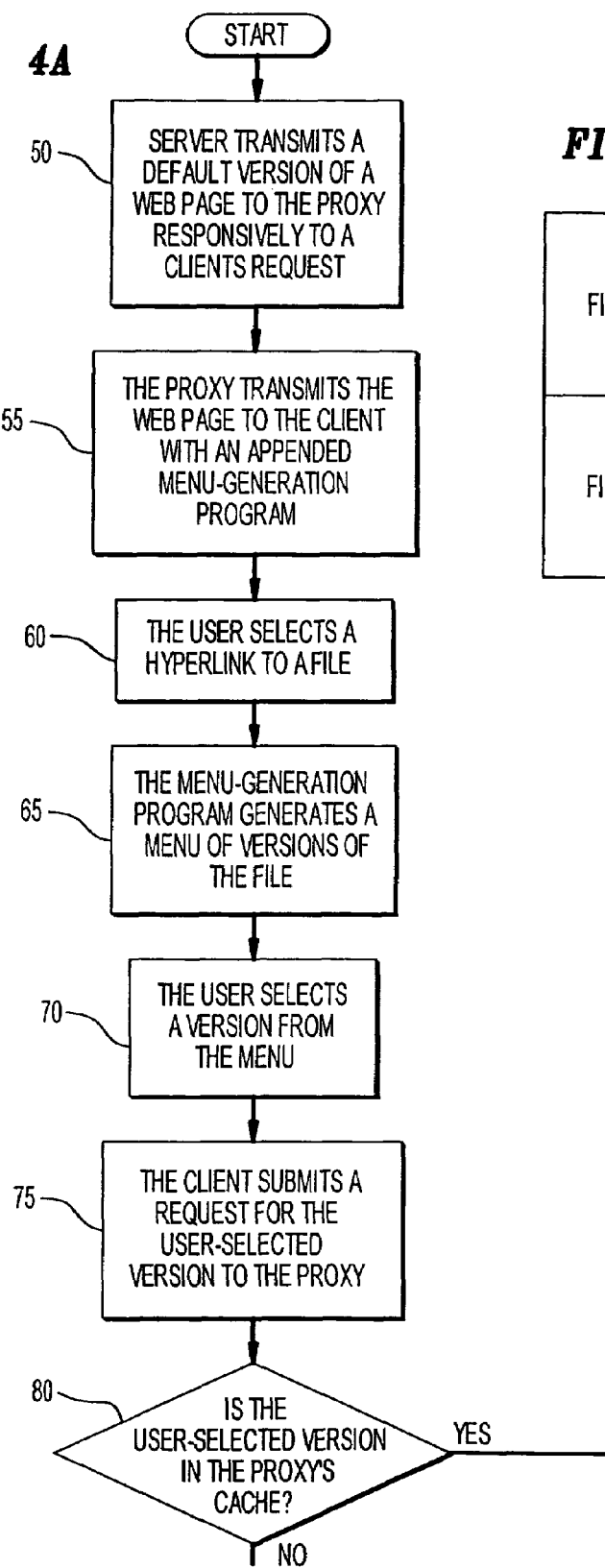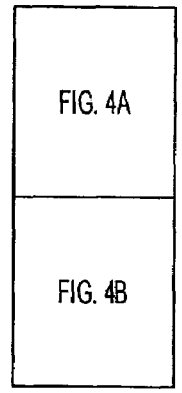

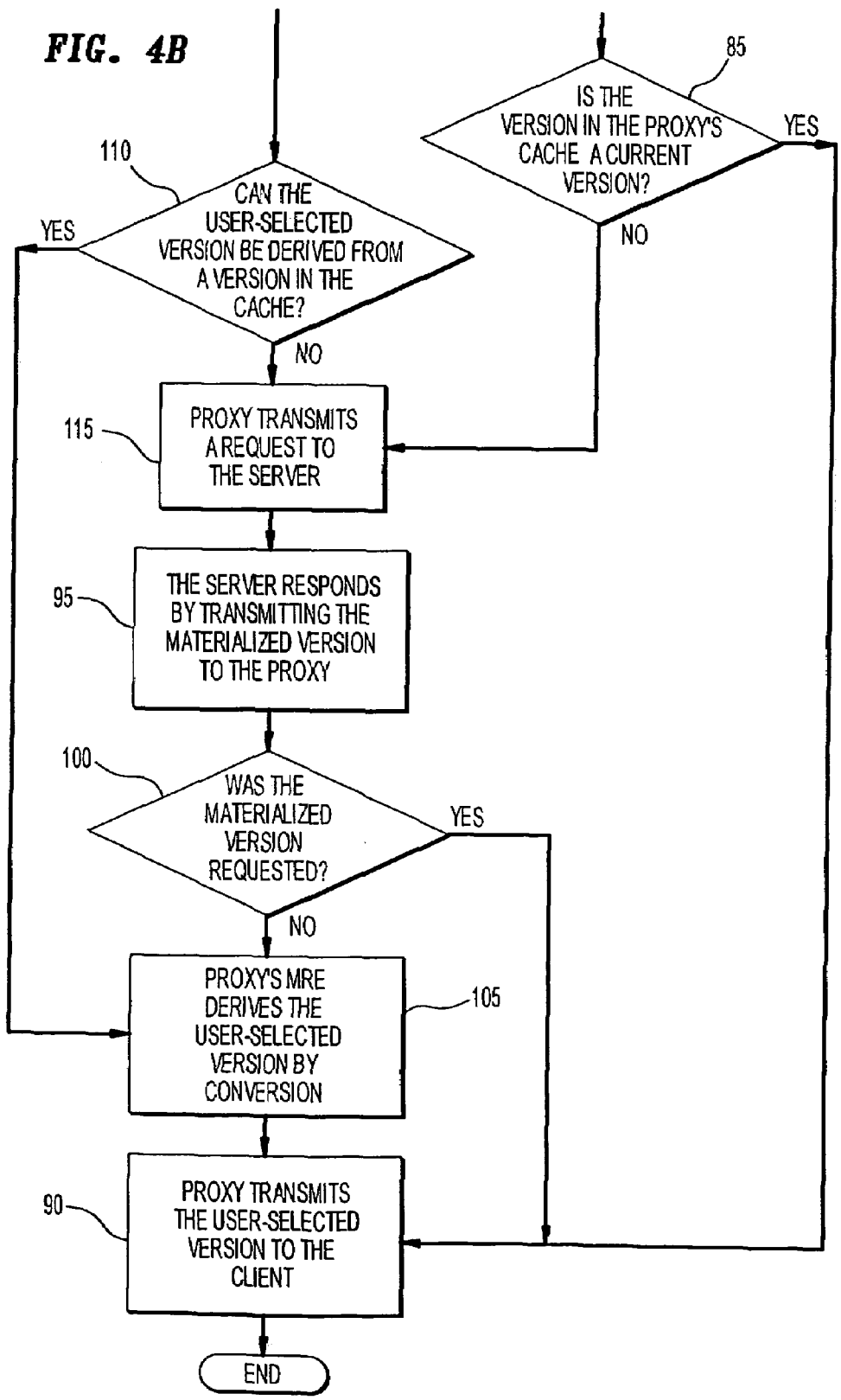

COMPUTER IMPLEMENTED METHOD AND APPARATUS FOR FULFILLING A REQUEST FOR INFORMATION CONTENT WITH A USER-SELECTABLE VERSION OF A FILE CONTAINING THAT INFORMATION CONTENT

CROSS-REFERENCE TO RELATED APPLICATIONS

This application is a continuation of U.S. patent application Ser. No. 09/328,627, filed Jun. 9, 1999 now U.S Pat. No. 6,826,593, and claims the benefit of U.S. Provisional Patent Application No. 60/098,737, filed Sep. 1, 1998.

FIELD OF THE INVENTION

This invention relates to communications networks, generally, and more particularly to a method of communication within such communication networks and apparatuses for practicing the method.

BACKGROUND OF THE INVENTION

Many emerging environments in the field of computer technology are increasingly facing a problem in that the data and computational requirements of software applications easily outstrip the system resources. The problem is particularly acute in multimedia environments such as intranets, the Internet (a communications network) or the World Wide Web (Web) as well as in many data intensive applications such as online analytical processing (OLAP) and multimedia databases.

The Web is essentially a distributed depository of files. The files are stored on Web servers connected by the Internet. Users of the Web may request transfer of files to their own computers, i.e., Web clients, for viewing, storing or printing. Each server stores files identified by a unique electronic address known as a universal resource locator (URL). A URL points to a particular server and identifies the location of a file on that server. Many of the files stored on Web servers are documents written in a standard programming language known as hypertext mark-up language (HTML). HTML files are translated for viewing, printing or storing by a Web browser (a computer program designed to display HTML files and communicate with Web servers). Using HTML, an author of such a file (Web page) can associate a hyperlink with a specific word, phrase or image in a document. While some files are stored on Web servers in HTML format, other files are available in non-standard formats which may not be translated for viewing, printing or storing by a standard Web browser. While some Web clients may be capable of translating such non-standard formats, others may not be so capable. Due to the vast heterogeneity of client resources, many files are available in formats that can only be translated by a subset of all clients while other files are stored in a plurality of formats to ensure translatability by most clients.

Users may access the World Wide Web in a variety of ways. Some users are fortunate enough to connect to the Internet with dedicated high-speed, high-bandwidth connections (e.g., T1, T3 or ISDN lines). However, many users, particularly users accessing the Internet from their homes, have only dial-up access to the Internet. In a dial-up arrangement, the user's computer typically has a modem for dialing and communicating with an Internet Service Provider to which the user subscribes. The Internet Service Provider typically maintains a proxy computer which is attached to the Internet via a dedicated communications line. The proxy intervenes between the Web server and Web client as described below.

Requests for file transfer, usually in the form of a GET URL HTTP request including a URL in the World Wide Web context, originate with the client and are forwarded to the proxy via the user's dial-up connection. The proxy then relays the request over the Internet to the appropriate Web server. The Web server responds by transmitting the requested file to the proxy. The proxy then relays that file to the client.

The user typically accesses files stored on the Web using Web browser software running on a Web client connected to the Internet. Typically, this is achieved by the user's selection of a hyperlink (typically displayed by the Web browser as an image, or a bold word or phrase) within a document being viewed with the Web browser. Each hyperlink is associated with an electronic address which uniquely identifies the file associated with the hyperlink indicating the file's location on a Web server. The electronic address is in the form of a URL. A user's selection of a hyperlink acts as a user's request for transmission of the file associated with the hyperlink to the client. The Web browser then issues a hypertext transfer protocol (HTTP) request for the requested file to the Web server identified by the requested file's URL. In response, the designated Web server returns the requested document to the Web browser, also using HTTP, provided that the file identified in the URL is present at the server identified in the URL at the location identified in the URL.

The standard HTML syntax of Web pages and the standard HTTP communications protocol supported by the Web guarantee that a Web browser can communicate with any Web server. The Javascript programming language and Javascript applets provide platform independent application programs over the Internet and the World Wide Web which can be run on any Web client.

Web pages typically are predominantly graphical in nature. The graphical images comprising each Web-page are generally much larger in size (bytes) than even lengthy simple text documents. Such large graphics files slow the response time for users of the Web. The delay is referred to herein as latency. Latency is primarily a function of the size of the file transmitted and the bandwidth of the connection over which the file is transmitted. As an ever increasing number of users, both individual and corporate in nature, use the Internet and the Web, response times have even further slowed.

FIG. 1 is a symbolic diagram of a simplified Web topology of the prior art. In the example of FIG. 1, the Web client 6 is the user's computer. The client may connect to the Internet Service Provider (not shown) over a communications line 10, using a modem in the client 6. The Internet Service Provider typically controls the proxy 16 which has a dedicated connection over a transmission link 20 to the Internet 26. The Internet 26 essentially is a sub-network of switching nodes and transmission links. A Web server 36 is connected to the Internet 26 by transmission link 30. In actuality, the Internet 26 is comprised of numerous servers, clients, proxies, transmission links, etc. between the proxy 16 and the Web server 36.

Using Web browser software running on the Web client C, the user requests an image, document, multimedia or other file (herein referred to collectively as "file") by submitting a request in the form of a URL. In a typical Web topology, the URL is transmitted to the proxy 16, which then forwards it over transmission link 20 to the Web server 36 via the Internet 26 and transmission link 30. The Web server 36 responds to the request by transmitting the file via the Internet 26 to the proxy 16 which then forwards the file to the client 6 for viewing, storing or printing. In such a Web architecture, the link between the client and the proxy is typically the critical bottleneck, i.e., a low bandwidth connection relative to the bandwidth of network connections between the proxy and the server.

In an effort to reduce latency, Internet Service Providers frequently provide a memory cache on their proxy computers. Generally, the cache is capable of storing a file so that a subsequent requests from the same or a different client for the same file may be fulfilled by the proxy without having to wait for transmission of the file from the server. A proxy 16 having a memory cache 18 is shown in FIG. 1. The cache stores a copy of a file requested by a client 6 and returned by the Web server 36 although it also forwards a copy of the file to the client 6. As referred to above, this has helped in decreasing latencies, from the client's standpoint, between requesting a file and receiving the requested file. This is achieved by checking the cache 18 for the requested file at the proxy 16 each time a URL request is received from a client 6. In a typical arrangement, if a copy of the file is resident in the cache 18, the file is forwarded to the client 6 provided that the file in the cache 18 is not stale, i.e., the copy in the cache is current because the file has not been updated on the server. Methods for determining whether a cached file is current are well-known in the art. This is determined, in some cases, by comparing the date of the request to an expiration date associated with the file resident in the cache and presuming that the cached file is current if the date of the request is prior to the expiration date. Alternatively, the proxy 16 may query the server to determine whether the copy of the cached file is current, the server 36 responding with a brief message if the cache-resident file is current and with a current copy of the file if the copy in the cache is not current. If the requested file is not in the cache 18, the proxy 16 forwards the URL request to the server 36 over the Internet 26. When the proxy receives the file from the Web server, a copy of the file is stored in the cache 18. Various caching algorithms are known in the prior art to determine which file in the cache to discard to make space for a recently requested file. Other caching algorithms are well-known in the art also.

Generally, a caching algorithm uses a metric representing the utility of caching a file to make such a determination. Typically, the utility metric is initialized when the file is retrieved for the first time and thereafter rises if the file is accessed. Otherwise, the metric falls with the passage of time. The cache-resident file with the least utility is usually discarded first to make space in the cache for a recently retrieved file. The difference between various caching algorithms is in their metrics for utility. In a well-known Least Recently Used ("LRU") LRU algorithm, the utility of a file is proportional to the recency of its last usage. In a more recently proposed GreedyDual-Size algorithm, the utility of a file also depends upon its size (in bytes). See Cao and Irani, "Cost-Aware WWW Proxy Caching Algorithms", Technical Report CS-TR-97-1343, University of Wisconsin, Madison, May 1997. However, prior art caching methods have been only minimally helpful in abating the latency problem since one of the causes of latency is the low bandwidth link between the proxy and the client which cached files must traverse.

As a result of latency, users are likely to welcome an option to retrieve a lower quality, smaller version of a file, provided that the file can be provided relatively quickly, i.e., with savings in latency. A current approach employed by many Web browsers enables a user to select, prior to a request for any particular file, to (1) receive all images at full resolution; or (2) reject all images and receive only text. In U.S. Pat. No. 5,764,235 to Hunt et al., a method is provided for receiving graphical images at predetermined resolution as selected and preset by the user. This method requires selection of a resolution or version prior to a request for any particular file.

SUMMARY OF THE INVENTION

Many users would likely choose to reject some image or document files, receive a lower resolution version of others fairly quickly, and would be willing to wait longer for a higher resolution version of others. In addition, apart from latency issues, some users requesting a file would like to select a version of the file in a format that is translatable by their Web clients, due to the resources available to the user's Web clients. Since the various versions of a file are related in that they share some or similar content it would be desirable to provide a single, logical point of access to a plurality of versions of a file.

Accordingly, it is an object of the present invention to provide a method of multiresolution allowing a user to receive a user-selected version of a file.

It is another object of the present invention to allow the user to select a version on a per-file basis for each file requested.

It is a further object of the present invention to provide a multiresolution engine that derives the user-selected version of the file from another readily accessible version when possible and the user-selected version is not readily accessible.

It is yet another object of the present invention to provide a method allowing access to a plurality of versions of a file from a single logical point of access.

It is yet a further object of the present invention to provide a deriving computer having a cache which is multiresolution-aware.

It is yet a further object of the present invention to provide a method for systematic multiresolution which requires no modifications to standard Web browser software, Web servers, or common communications protocols.

It is yet a further object of the present invention to provide a communications network in which the server and proxy are multiresolution aware.

These and other objects are realized by the provision of an apparatus and method by which a user of a communications network may request and receive files over the network in various user-selectable formats and/or resolutions; i.e., versions. A user working at a client computer (e.g., a computer running client software) on the network can request the transmission of a file such as through the selection of a hyperlink on a web page currently being viewed. A user first determines information content the user wishes to receive. In accordance with the present invention, the user selects a logical link to such content and is presented with a menu of versions of files containing that information content. The user selects a version from the menu. The desired version is transmitted to the client in the usual fashion if the version is materialized (resident) on a server computer or intermediate proxy computer. If the desired version is not materialized, the desired version is automatically derived from an appropriate materialized version.

In a preferred embodiment, the client generates a menu of versions of the requested file which the user may choose to receive upon selection of a hyperlink serving as a single logical access point to all versions appearing as options on the menu. The available versions comprise all versions of the file that are resident at the server corresponding to the requested file or an intermediate proxy as well as versions of the file that can be automatically derived from the resident version(s).

The multiresolution engine for selectively providing a user-selected version may be resident on a proxy rather than on the servers or clients. This embodiment minimizes the number of computers that require the specialized apparatus for providing multiresolution capabilities in accordance with the present invention.

Further, the proxy may comprise a cache for storing one or more versions of a file. The proxy also may comprise programs for determining which versions are derivable from versions stored in its cache so that it need not use up cache space storing versions that can be derived. If a requested version of a file is neither available nor derivable from a version available in the cache, then the proxy will retrieve an available version of the file from the corresponding server and either forward it to the client or derive the requested version from the retrieved version and forward the derived version to the client.

In an advantageous embodiment of the invention, the proxy also may include programming for (1) determining whether the version(s) of a file resident in the cache are current, (2) running a caching algorithm for determining which files to delete from the cache when new files must be added and (3) transmitting to clients the program for generating the version selection menu,

DESCRIPTION OF THE DRAWINGS

FIG. 4 (comprising FIGS. 4A and 4B) is a flowchart representing communications between a Web client and Web server in accordance with the present invention.

DETAILED DESCRIPTION

The present invention relates to communication in a communications network. The present invention provides a method and apparatuses for providing systematic multiresolution, i.e., a method of providing requested content in a user-selected version of a file, the selection being made on a per-request basis. In other words, systematic multiresolution provides for transmission of files at different levels of quality, i.e., resolution, and cost as well as in a variety of formats. A high resolution version of a file may be provided at a high cost, in terms of network resources and latency in reception of the file or, at the user's option, a smaller, lower resolution, version of the file may be provided with a corresponding savings in such costs. Alternatively, systematic multiresolution provides the user with the ability to receive a user-selected version of a requested file, the selection being dependent upon the user's desire for a version in a particular format or at a particular resolution.

Accordingly, each user's request for a file is fulfilled pursuant to the user's selection of a version of the file proximate the time of the request. The user's selection of a version typically may depend upon the user's capability for translating the file format, intended use for the file and/or tolerance for latency. Accordingly, a user may request different files at different levels of resolution or in different formats, i.e., different versions.

The invention can be used in a variety of applications, including multimedia databases, video and audio-based applications, as well as in other environments where the data and computational requirements typically heavily burden network resources. The invention is particularly useful in the World Wide Web environment where high degrees of latency are common and Web client resources and individual users' requirements and translation capabilities are vastly heterogeneous. Accordingly, although the invention is applicable in a wide variety of applications, the invention will be discussed herein in the context of its application to the World Wide Web.

Figure 1:
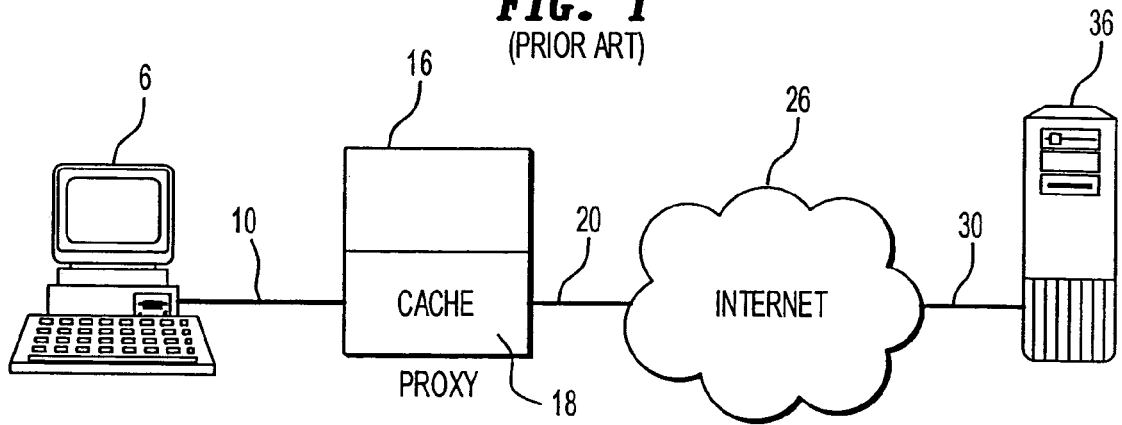
FIG. 1 is a symbolic diagram of a simplified World Wide Web topology as known in the prior art.
Figure 2:
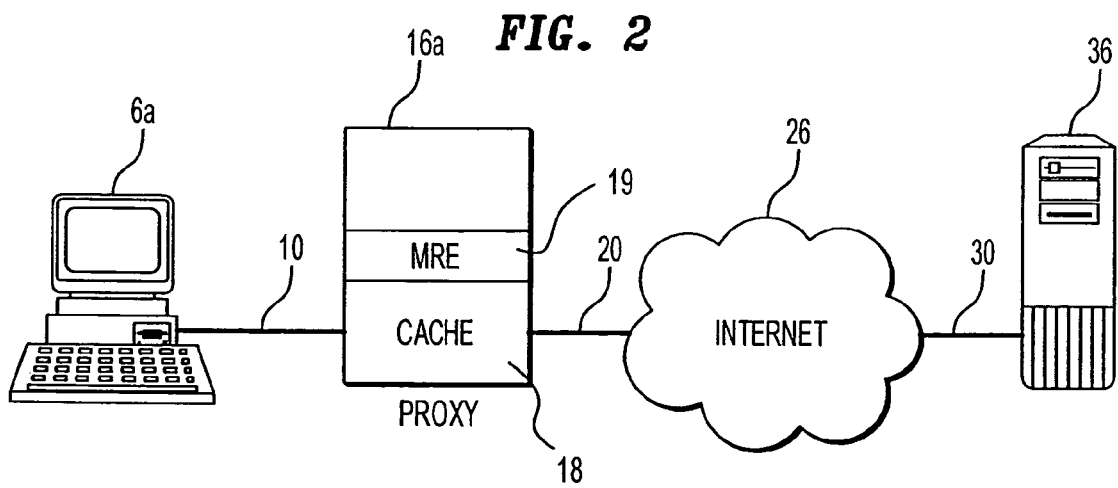
FIG. 2 is a symbolic diagram of a simplified World Wide Web topology in accordance with the present invention.

The present invention is embodied in three principle aspects: a multiresolution engine (MRE), cache management, and a user interface provided at the client. The preferred embodiment of the invention comprises all three of these aspects. While the multiresolution engine and cache management may reside at the client, the server, or at an intermediate point, it is preferable that the multiresolution engine 19 and the cache management 18 reside at a proxy 16*a* intermediate the client 6*a* and the server 36. Such a proxy-based design configuration is shown symbolically in FIG. 2. Use of a proxy-based design is preferable because it achieves the advantages of the invention without the need for any modifications to Web browser software, the Web server software, or the HTTP protocol. In addition, the proxy-based design is sensible from an implementation standpoint because widespread use of the invention may be achieved by providing a publicly available proxy or by convincing a relatively small number of Internet Service Providers to upgrade their proxies in accordance with the invention, rather than convincing hundreds of thousands or perhaps millions of Web servers and/or clients to run new software to implement the invention, as would be required in a client- or server-based design. Such a centralized proxy-based design is also cost-effective for implementation, maintenance, and upgradeability.

The invention is described with reference to terminology described below. It is first noted that a set of files are related if they share the same general subject matter, i.e., content. That content, independent of its embodiment in any file, is referred to herein as the target file. For example, the target file may be an image of a clown. That content may be provided in a variety of versions, each version being a file in and of itself, the various versions having various levels of resolution and/or having various formats. For example, a black and white image of a clown may be said to have the same content as a corresponding multi-color clown image, wherein the black and white version of the clown image may be said to have a lower resolution than the corresponding multi-color clown image. Lower resolution versions of a high resolution file are typically smaller in size (bytes) than higher resolution versions of that file. However, for two versions in different formats, the lower resolution version could be larger in size depending upon the format.

Furthermore, a file having identical content, and perhaps even identical resolution may exist in a variety of formats. Somewhat by convention, the format of the file may frequently be discerned by the extension to the file's filename.

For example, GIF and JPEG are two common image file formats which have the same or substantially the same resolution. For an image file named "clown", the GIF format version is likely to have a filename of "clown.gif" and the JPEG version of the file is likely to have a filename of "clown.jpg". By way of further example, common document formats include postscript and ADOBE® ACROBAT® formats. These formats typically are denoted by .ps and .pdf filename extensions, respectively. Alternatively, a file's format may be discernable from its Multipurpose Internet Mail Extensions (MIME) type designation, as is well-known in the art. These formats are discussed by way of example only and are not intended to constitute an exhaustive list.

A "version" may be categorized as either a derivable version or a non-derivable version. A derivable version is a version which may be derived from another version, referred to herein as a "parent" version by conversion. Conversion is a process performed automatically, as by computer software, without the need for human intervention. Generally, conversion generates a lower resolution version from a higher resolution version or generates a version having one format from another version having a different format. An exception is in the case in which two files are derivable by conversion from each other. Two such files are said to have essentially the same resolution.

Such conversion programs are well-known in the art. For example, conversion programs are common for converting image files from GIF to JPEG format, and vice versa, and from higher-resolution, many pixel, many color versions to successively lower-resolution, fewer pixel, fewer color versions. Multiple levels of resolution may exist. Conversion programs are also common for converting document files from postscript to ADOBE® ACROBAT® format and vice versa. Whether a version is derivable or not depends upon the conversion software available to the multiresolution engine.

Non-derivable versions are versions which cannot be derived from another version by conversion. This may be due to the fact that appropriate conversion software is unavailable or because human intervention is required to create a lower resolution version and no conversion software exists. This is common in the case of text documents, such as a high resolution full-length article and a lower resolution abstract of the article. While derivable versions may be derived from another version, a non-derivable version must be materialized, i.e., stored, on the server. By noting the derivability and resolution relationships of versions of a file, an Internet Service Provider can determine, for a set of versions the Internet Service Provider chooses to make available to users, a minimal set of materialized versions which need be stored on the server, the remaining versions being derivable from the materialized versions.

Figure 3A:
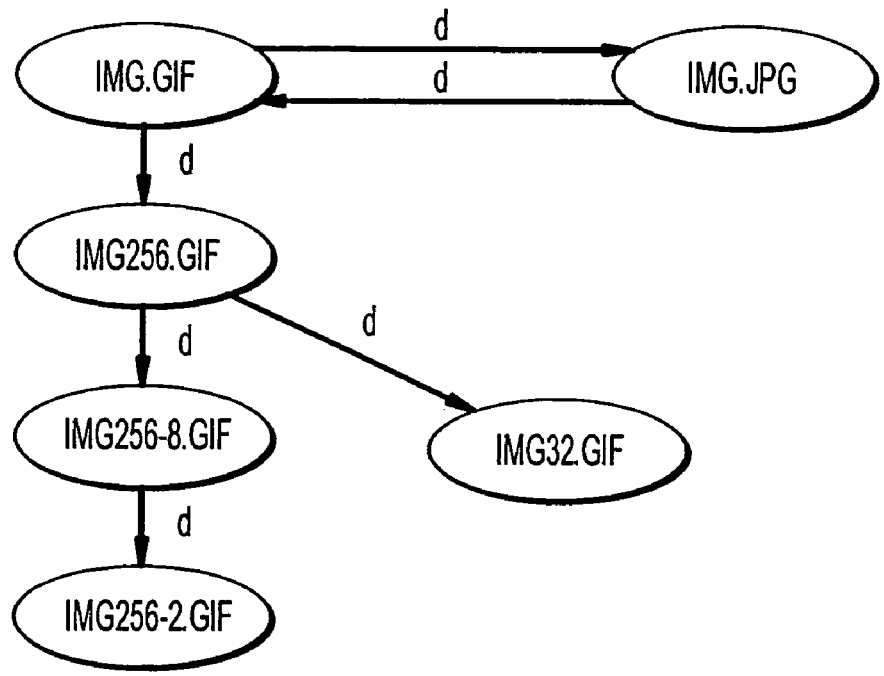
FIG. 3A is an example of a resolution and derivability chart for an image file in accordance with the present invention.

FIG. 3A is an example of a hypothetical resolution and derivability chart for an image file. All files in the example of FIG. 3A have the same content but each is a different version. In the example of FIG. 3A, IMG.JPG is a color image file in JPEG format, IMG.GIF is an image file in GIF format, IMG256.GIF is a 256×256 pixel version using the same number of colors in GIF format, IMG32.GIF is a 32×32 pixel version using the same number of colors in GIF format, IMG256-8.GIF is a 256×256 pixel version using 8 colors in GIF format, and IMG256-2.GIF is a 256×256 pixel black and white version in GIF format. The resolution and derivability chart shows that IMG.GIF and IMG.JPG have essentially the same resolution (as indicated by arrows pointing from IMG.GIF to IMG.JPG and IMG.JPG to IMG-.GIF) and are derivable from each other (derivability being indicated by a "d" adjacent an arrow extending toward the lower resolution derived version from the higher resolution version from which the version may be derived). The chart further indicates that IMG256.GIF, is of lower resolution and derivable from IMG.GIF, that IMG32.GIF is of lower resolution and derivable from IMG256.GIF, that IMG256-8.GIF is of lower resolution and derivable from IMG256.GIF, and that IMG256-2.GIF is of lower resolution and derivable from IMG256-8.GIF. The derivability chart is a result of the conversion software available to the multiresolution engine in the example.

Figure 3B:
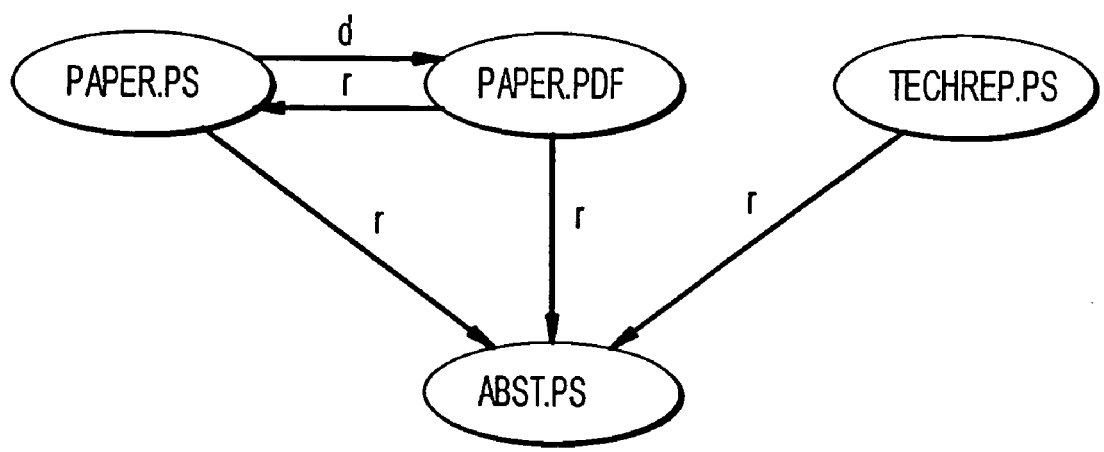
FIG. 3B is an example of a resolution and derivability chart for a document file in accordance with the present invention.

FIG. 3B is an example of a hypothetical resolution and derivability chart for a document file. This example illustrates that lower resolution does not necessarily imply derivability. In the example, PAPER.PS is a document file in postscript format, PAPER.PDF is a version of PAPER.PS having the same content but in ADOBE® ACROBAT® format, TECHREP.PS is a version of the same content but with modifications to put the paper in the layout of a technical report, and ABST.PS is an abstract of the same content in postscript format. The chart illustrates that PAPER.PS and PAPER.PDF have essentially the same resolution (as indicated by arrows extending from PAPER.PS to PAPER.PDF and vice versa), that PAPER.PDF is derivable from PAPER.PS but, because of the lack of conversion software available to the multiresolution engine in this example, PAPER.PS is not derivable from PAPER.PDF although PAPER.PDF is of higher resolution than PAPER.PS (as indicated by an "r" adjacent an arrow extending from PAPER.PDF to PAPER.PS). However, such conversion software may exist. The chart also illustrates that ABST.PS is of lower resolution than PAPER.PS, PAPER.PDF and TECHREP.PS but is not automatically derivable by conversion from any of these versions. No conversion software exists to derive ABST.PS by conversion. Rather, human intervention and creativity is required to compose such a version, i.e., an abstract of a document.

The present invention provides support for multiple versions of a target file by allowing access to the materialized versions and all versions derivable therefrom by dynamically generating a user-selected version upon request from the client when the user-selected version is not a materialized version but a version derivable from a materialized version. In other words, lower resolution versions and versions having various formats may be generated on-the-fly from a materialized or other version by a multiresolution engine (MRE) in response to a user's selection. The computer on which the MRE resides is generically referred to herein as the deriving computer. In the preferred embodiment, the multiresolution engine resides at a proxy intermediate a client and a server. However, the multiresolution engine may reside at the Web server, the client or at any intermediate point, as referred to above. Preferably, all versions are accessible from a single logical point of access, with the user being afforded the opportunity to select a version (resolution and/or format) after selecting the point of access to the target file. In accordance with the present invention, the inventive method of communication is carried out as shown in the flowchart of FIG. 4.

When a user first requests a Web page that he wishes to receive, for example, by typing a Web page's URL into the user's Web browser or by selecting a hyperlink to the Web page, the server specified in the URL responds by transmitting a skeleton of the Web page to the client, the skeleton containing links or pointers to images and/or other files embedded within the Web page. The Web browser then automatically requests these embedded files from the server to load the Web page. Referring to FIG. 4 as shown at step 50, the server transmits them to the proxy. In step 55, the proxy then transmits the files to the client. The particular version of each file that is sent from the proxy to the client can be set either by defaults set by software at the proxy, or at a preferred client default setting, if the user has previously registered a preferred client default setting with the proxy. If necessary, the proxy may derive by conversion the version specified by either the client or the proxy default setting. Along with the transmission of the skeleton of the requested Web page, the proxy transmits a computer program (hereinafter "the menu-generation program") capable of generating, upon a client's request for a target file, a menu of versions of the target file which are available either by being materialized or derivable from the materialized version(s). The menu presents user-selectable options, preferably in the form of hyperlinks, each hyperlink being associated with one of the versions. The menu-generation program is preferably a small program written in the platform-independent Javascript programming language. In an alternate embodiment the menu-generation program is resident at the client.

The user may then request a target file by selecting a hyperlink from the displayed Web page, as at step 60. The hyperlink is not simply a link to a particular file at an electronic address specified in the URL associated with the hyperlink. Rather, the hyperlink is a logical point of access to a plurality of versions (i.e., files) of the target file associated with the hyperlink selected content which are either materialized (and identified associated with the hyperlink) or derivable from a materialized version. (U.S. patent application Ser. No. 09/328,607, filed concurrently herewith, now U.S. Pat. No. 7,047,483, describes a preferred method and apparatus of providing such logical access points). Upon selection of a hyperlink a menu is generated as shown at step 65 by execution of the menu-generation software, and displayed at the client. Although it is preferable that the menu-generation software is transmitted to the client and that the client generates the menu, these steps may be performed at any appropriate computer. The user then selects a version of the target file from the menu as shown at step 70. The menu generation software then creates a multiresolution URL ("MRURL") comprising the URL for a materialized parent file as well as information regarding the version selected by the user. In other words, in accordance with the present invention, the client transmits a request for a version of a file identified in the request. In the preferred embodiment, the MRURL associated with the user-selected version of the target file is transmitted from the client to the proxy, as shown at 75 in FIG. 4.

In the preferred embodiment, a cache resides on the proxy and the cache is multiresolution aware. In response to the request for the user-selected version of the file, the proxy checks the cache to determine if the selected version is resident in the cache as shown at step 80.

In step 85, if the selected version is in the cache, the proxy determines whether the version in the cache is a current version. As described above, methods for doing so are well known in the art. If the version in the cache is current, in step 90, the proxy transmits the user-selected version to the client. If the version in the cache is not current, the proxy requests a materialized version from the server as shown at step 115, and the server responds by transmitting a materialized version of the target file to the MRE as shown at 95. In step 100, the proxy then determines if the materialized version is the user-selected version. If so, the proxy simply transmits the user-selected (materialized) version to the client as shown at 90. If the materialized version is not the user-selected version, the multiresolution engine derives the user-selected version by conversion as shown at 105 before the proxy proceeds to step 90 to transmit the user-selected version to the client.

If, in step 80, it is determined that the requested version is not in the proxy's cache, in step 110, the proxy determines whether the user-selected version can be derived from a version of the target file in the cache. If there is no version of the target file in the cache, the user-selected version cannot be derived. If the user-selected version can be so derived, the proxy's multiresolution engine derives the user-selected version by conversion from the version in the cache as shown at step 105 and transmits the user-selected version to the client as shown at step 90. If the user-selected version cannot be derived from a version in the cache, in step 115, the proxy transmits a request to the server for a materialized version. In step 95, the server responds by transmitting the materialized version to the proxy. In step 100 it is determined whether the user-selected version is the materialized version. If so, flow proceeds to step 90 where the proxy transmits the materialized version to the client. If, in step 100, it is determined that the user did not select the materialized version, the proxy's multiresolution engine derives the user-selected version by conversion from the materialized version as shown at 105. The proxy then transmits the user-selected version to the client as shown at 90.

In accordance with the present invention, the materialized version transferred from the server and any version derived by conversion therefrom are preferably stored in the proxy's cache. A proxy using multiresolution-aware caching enhances the performance of the Web service. In the preferred embodiment, the proxy uses a caching algorithm which assigns utility to a file on the basis of both the recency of its last usage and its size. For that reason, a GreedyDual-Size algorithm is advantageous. An "ignore" heuristic may be employed which provides that derived versions are not cached if they can be derived from a version already in the cache. In the preferred embodiment, the cache employs a "save" heuristic in which all derived versions are stored in the cache and treated as newly cached objects. Other suitable caching algorithms also may be employed.

In the preferred embodiment, a multiresolution-aware server is employed in addition to the proxy's multiresolution-aware cache. A multiresolution-aware server is one which stores multiresolution-aware Web pages. In a multiresolution-aware Web page, the Web page's author provides a hyperlink to a target file which is associated with a MRURL which contains information about all versions of that target file that are materialized on the server. In so providing, the menu-generation program is capable of generating a single menu providing user-selectable options for all materialized versions and all versions derivable from each materialized version. This permits presentation to the user of a broader selection of versions of the target file upon the user's selection of the single logical point of access (hyperlink). In such a scenario, the single hyperlink is a logical link to the target file. The logical link provides access to a plurality of versions, many of which may not be materialized on the server associated with the logical hyperlink but rather may be derived from the version(s) materialized on that server or cached at the proxy. This provides the benefit of less-cluttered Web pages, more options for the user, and the ability to bookmark a hyperlink in a browser independent of its version so that one version may be selected on a first occasion and the same bookmarked link may be revisited easily and a different version may be selected on a subsequent occasion.

The invention, as a whole, provides the benefits of decreased latencies due to novel caching techniques, decreased latencies due to the transmission of smaller, lower resolution, versions of files in instances in which smaller lower resolution versions are selected by the user, and the corresponding savings in network traffic and network resources. The invention also provides access to a plurality of derivable versions of content from a single version materialized on a server through a single logical access point. Advantageously, the invention also allows the user to select, subsequent to the time of the request, a version of the target file on a per-request or per-file basis. Furthermore, the invention is easily extensible to a broad range of applications and is capable of accommodating a broad range of file formats. Moreover, the invention is easily implemented, maintained and upgraded, particularly in the preferred embodiment, for widespread use since changes can be made at relatively few proxies, which will affect numerous clients and servers.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A method for communicating between computers interconnected by a communications network, the method comprising the steps of:
    (a) receiving, at a deriving computer, a request from a client computer for transmission to the client of a user-selected version of a target file, the target file having particular informational content independent of its embodiment in a particular version;
    (b) responsive to receiving the request in step (a), transmitting from the deriving computer to a server computer distinct from the deriving computer a request for transmission to the deriving computer of a materialized parent file from which the user-selected version may be derived by conversion, the materialized parent file being stored on the server computer;
    (c) at the deriving computer, deriving by conversion the user-selected version from the materialized file, the materialized file having a first file format, the user-selected version derived by conversion having a second file format different from the first file format; and
    (d) transmitting, from the deriving computer to the client computer, the user-selected version.

2. The method set forth in claim 1, further comprising the step of:
    (e) transmitting, from the deriving computer to the client, a program for generating a menu of user-selectable versions of the target file, step (e) being performed before step (a).

3. A proxy computer for satisfying a request for a user-selected version of a target file, the proxy computer comprising:
    a memory cache;
    a first program for requesting from a server computer a materialized parent version of the target file from which the user-selected version can be derived if such a version is not stored on the proxy computer;
    a second program for deriving the user-selected version from the parent version by conversion;
    a third program for transmitting the user-selected version to a client computer in response to the request;
    a fourth program for determining whether the user-selected version is derivable from a parent version resident in the proxy computer's cache; and
    a fifth program for deriving the user-selected version from a parent version resident in the cache.

4. The computer of claim 3 wherein the proxy computer comprises a program for transmitting menu-generation information to a client along with a communication transmitted from the proxy computer to the client.

5. A method for communicating between a client and a server interconnected to the client by a communications network, the method comprising the steps of:
    (a) receiving, at a proxy computer between the client and the server, a client's request for transfer of a file having particular informational content;
    (b) identifying a parent file embodying the informational content, the parent file being stored at the server;
    (c) deriving at the proxy computer, by conversion of the parent file, a derived version of the parent file, the derived version being a predetermined low resolution version that is established as a default setting for delivery of files before receipt of the client's request for the parent file; and
    (d) transmitting the derived version to the client in response to the request.

6. The method set forth in claim 5, wherein the default setting is specified by the client.

7. The method set forth in claim 5, wherein the default setting is specified by a proxy for relaying a communication between a sender and a receiver.

8. The method set forth in claim 5, the method further comprising the steps of:
    (e) requesting, at the proxy, transfer of the parent file from the server to the proxy; and
    (f) receiving, at the proxy, the parent file.

9. The method set forth in claim 5, further comprising the step of:
    generating at the client, a menu of user-selectable versions of the target file.

10. The method set forth in claim 5, further comprising the steps of:
    (e) determining whether the default version of the target file is resident in a memory cache on a proxy computer in the communications network; and
    (f) transmitting the default version of the target file from the cache to the client if the user-selected version is resident in the cache.

11. The method set forth in claim 10, further comprising the steps of:
    (g) determining whether the default version of the target file can be derived by conversion from any version of the target file resident in the cache; and
    (h) deriving by conversion the default version of the target file from a version resident in the cache if the default version can be so derived.

12. The method set forth in claim 10, wherein the cache employs an ignore heuristic technique to manage the identity of the files resident in the cache, such that the cache does not store versions which are derivable from other versions resident in the cache.

13. The method set forth in claim 10, wherein the cache employs a save heuristic technique to manage the identity of the files resident in the cache, whereby all derived versions are stored in the cache.

14. The method set forth in claim 10, wherein the cache determines whether a version resident in the cache is a current version of the target file and requests a current version of the target file if the version resident in the cache is not a current version.

15. A method for communicating between computers interconnected by a communications network, the method comprising the steps of: receiving a request for transmission to a client of a file, the file having particular informational content, resolution, and format;
   automatically deriving, by conversion of a materialized file having the particular informational content, a derived version of the file, the derived version of the file having the particular informational content at a lower resolution than the materialized file, the resolution and format of the derived version being determined by a predetermined default setting for delivery of files that is established before receipt of the request for the parent file; and
   transmitting, from the deriving computer to the client, the derived version;
   whereby the file requested has a particular resolution and format, and the request is satisfied by transmitting the derived version to the client, the derived version having a different resolution or format as determined by the default setting.

16. The method set forth in claim 15, wherein the default setting is specified by the client.

17. The method set forth in claim 15, wherein the default setting is specified by a proxy for relaying a communication between a sender and a receiver.

18. The method set forth in claim 15, wherein the deriving step is performed at a proxy for relaying a communication between a sender and a receiver.

19. The method set forth in claim 18, wherein the materialized file is not resident at the proxy, but rather is received by the proxy in response to the proxy's request for transmission of a materialized parent file from which the user-selected version may be derived by conversion, the proxy requesting the parent file from a server responsive to the client's request.

20. A method for communicating between client and server computers interconnected by a communications network, the method comprising:
   responsive to a user's selection of a hyperlink to a target file having particular informational content, receiving a request for transmission of the target file to a client, the hyperlink being independent of any version of the target file;
   transmitting to a server, responsive to receiving the request for transmission of the target file, a request for transmission of a materialized parent file from which another version may be derived by conversion;
   deriving, in accordance with a predetermined default setting, a derived version of the materialized file embodying the particular informational content, the derived version embodying the particular informational content but having a resolution lower than the materialized file; and
   transmitting, to the client, the derived version.

21. The method set forth in claim 20, wherein the default setting is specified by the client.

22. The method set forth in claim 20, wherein the default setting is specified by a proxy for relaying a communication between a sender and a receiver.

23. The method set forth in claim 20, wherein the deriving step is performed at a proxy for relaying a communication between a sender and a receiver.

24. A method for communicating between computers interconnected by a communications network, the method comprising the steps of:
   receiving from a server, at a proxy computer for relaying a communication between a sender and a receiver, a materialized file having particular informational content, resolution and format, the materialized file being received at the proxy responsive to a request for the materialized file;
   deriving by conversion of the materialized file, at the proxy computer, a derived version embodying the particular informational content but having a resolution and format determined by a predetermined default setting; and
   transmitting, from the proxy computer to a client computer, the derived version to satisfy the request.

25. The method set forth in claim 24, wherein the default setting is specified by the client.

26. The method set forth in claim 24, wherein the default setting is specified by the proxy.

* * * * *